US010919555B1

(12) United States Patent
Spruill

(10) Patent No.: US 10,919,555 B1
(45) Date of Patent: Feb. 16, 2021

(54) AUTOMATED ROBOTIC SHOPPING CART

(71) Applicant: Robert Spruill, Waldorf, MD (US)

(72) Inventor: Robert Spruill, Waldorf, MD (US)

( * ) Notice: Subject to any disclaimer, the term of this patent is extended or adjusted under 35 U.S.C. 154(b) by 317 days.

(21) Appl. No.: 16/161,157

(22) Filed: Oct. 16, 2018

(51) Int. Cl.
B62B 3/14 (2006.01)
B62B 5/04 (2006.01)
B62B 5/00 (2006.01)
G05D 1/02 (2020.01)

(52) U.S. Cl.
CPC .......... B62B 3/1404 (2013.01); B62B 3/1416 (2013.01); B62B 5/0046 (2013.01); B62B 5/0056 (2013.01); B62B 5/0069 (2013.01); B62B 5/0423 (2013.01); G05D 1/0278 (2013.01)

(58) Field of Classification Search
None
See application file for complete search history.

(56) References Cited

U.S. PATENT DOCUMENTS

| 6,746,030 | B1 | 6/2004 | Bartlett | |
| 7,438,148 | B1 * | 10/2008 | Crea | B62D 1/24 |
| | | | | 180/167 |
| 7,762,458 | B2 | 7/2010 | Stawar | |
| 8,152,062 | B2 | 4/2012 | Perrier | |
| 8,789,638 | B2 | 7/2014 | Zhang | |
| 8,905,175 | B2 | 12/2014 | Chang | |
| 9,104,205 | B1 | 8/2015 | Caver | |
| D800,986 | S | 10/2017 | Magnusson | |
| 2004/0217166 | A1 * | 11/2004 | Myers | G07G 1/00 |
| | | | | 235/383 |
| 2006/0012138 | A1 * | 1/2006 | Otterlee | B62B 3/1424 |
| | | | | 280/33.993 |
| 2014/0277841 | A1 * | 9/2014 | Klicpera | A45C 13/385 |
| | | | | 701/2 |

* cited by examiner

Primary Examiner — Jonathan M Dager
Assistant Examiner — Garrett F Evans

(57) ABSTRACT

The automated robotic shopping cart is a shopping cart with a controller and locomotion subsystem. The controller may provide shopping assistance to the shopper and may play audio/visual programming to entertain a child riding in the cart. The controller may wirelessly pair with a phone carried by the shopper and may use battery powered motors to propel and steer the cart such that the cart follows the shopper through a store. The battery may be recharged from a solar panel when the cart is outdoors. A GPS receiver in the controller may determine the physical location of the cart and may activate a brake if an attempt is made to remove the cart from the retail property. The invention may further comprise a reading light to illuminate products and a distress button to request assistance.

16 Claims, 5 Drawing Sheets

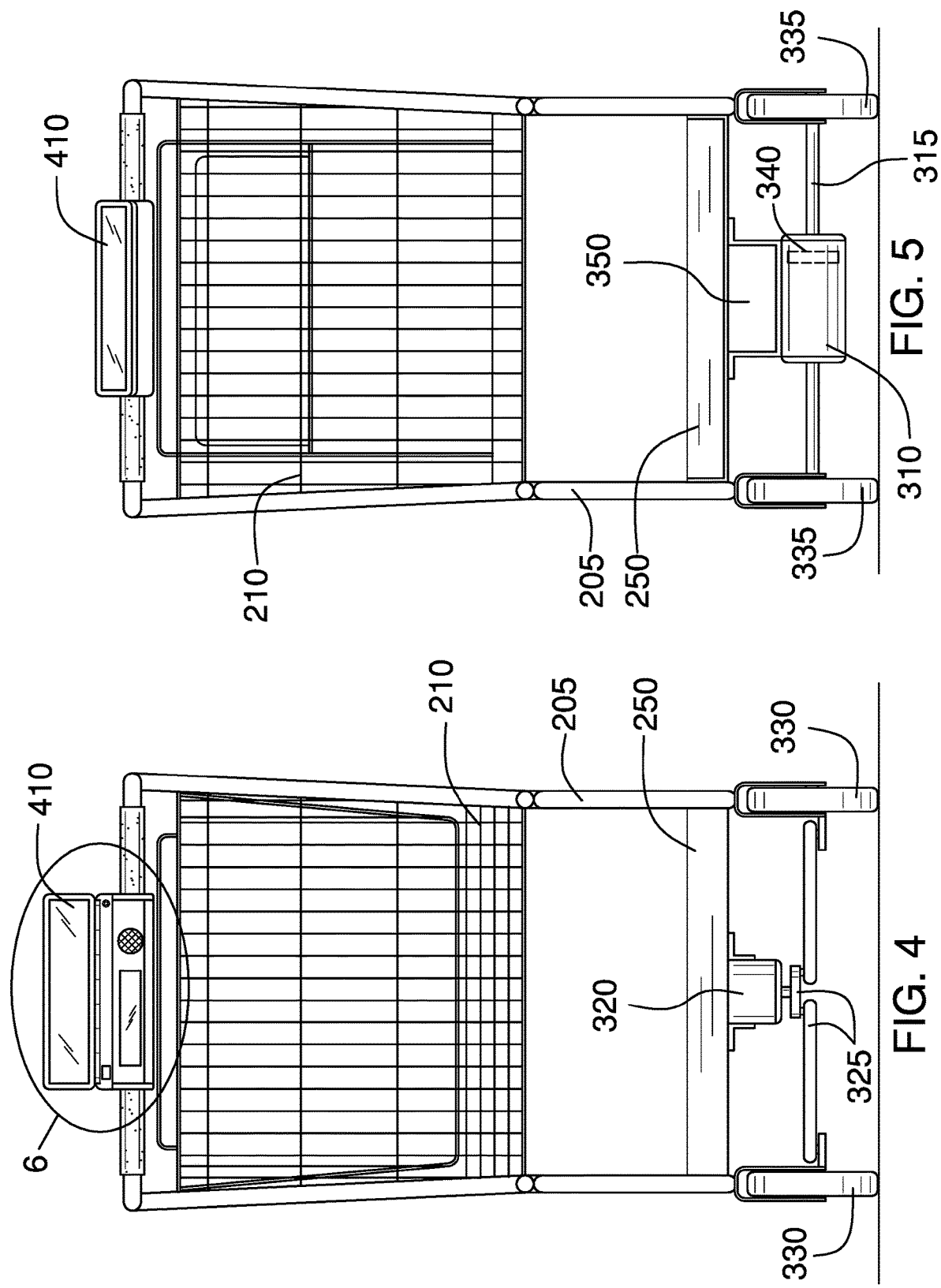

AUTOMATED ROBOTIC SHOPPING CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of retail equipment, more specifically, an automated robotic shopping cart.

SUMMARY OF INVENTION

The automated robotic shopping cart is a shopping cart with a controller and locomotion subsystem. The controller may provide shopping assistance to the shopper and may play audio/visual programming to entertain a child riding in the cart. The controller may wirelessly pair with a phone carried by the shopper and may use battery powered motors to propel and steer the cart such that the cart follows the shopper through a store. The battery may be recharged from a solar panel when the cart is outdoors. A GPS receiver in the controller may determine the physical location of the cart and may activate a brake if an attempt is made to remove the cart from the retail property lot. The invention may further comprise a reading light to illuminate products and a distress button to request assistance.

An object of the invention is to provide a shopping cart that follows a shopper through a store.

Another object of the invention is to provide one or more solar panels for recharging a battery when the cart is outdoors.

A further object of the invention is to provide entertainment to a child riding in the cart.

Yet another object of the invention is to prevent theft of the cart by activate a brake if an attempt is made to remove the cart from the retail property.

These together with additional objects, features and advantages of the automated robotic shopping cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the automated robotic shopping cart in detail, it is to be understood that the automated robotic shopping cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the automated robotic shopping cart.

It is therefore important that the claims be regarded as including such equivalent construction insofar as they do not depart from the spirit and scope of the automated robotic shopping cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a front view of an embodiment of the disclosure.

FIG. 5 is a rear view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
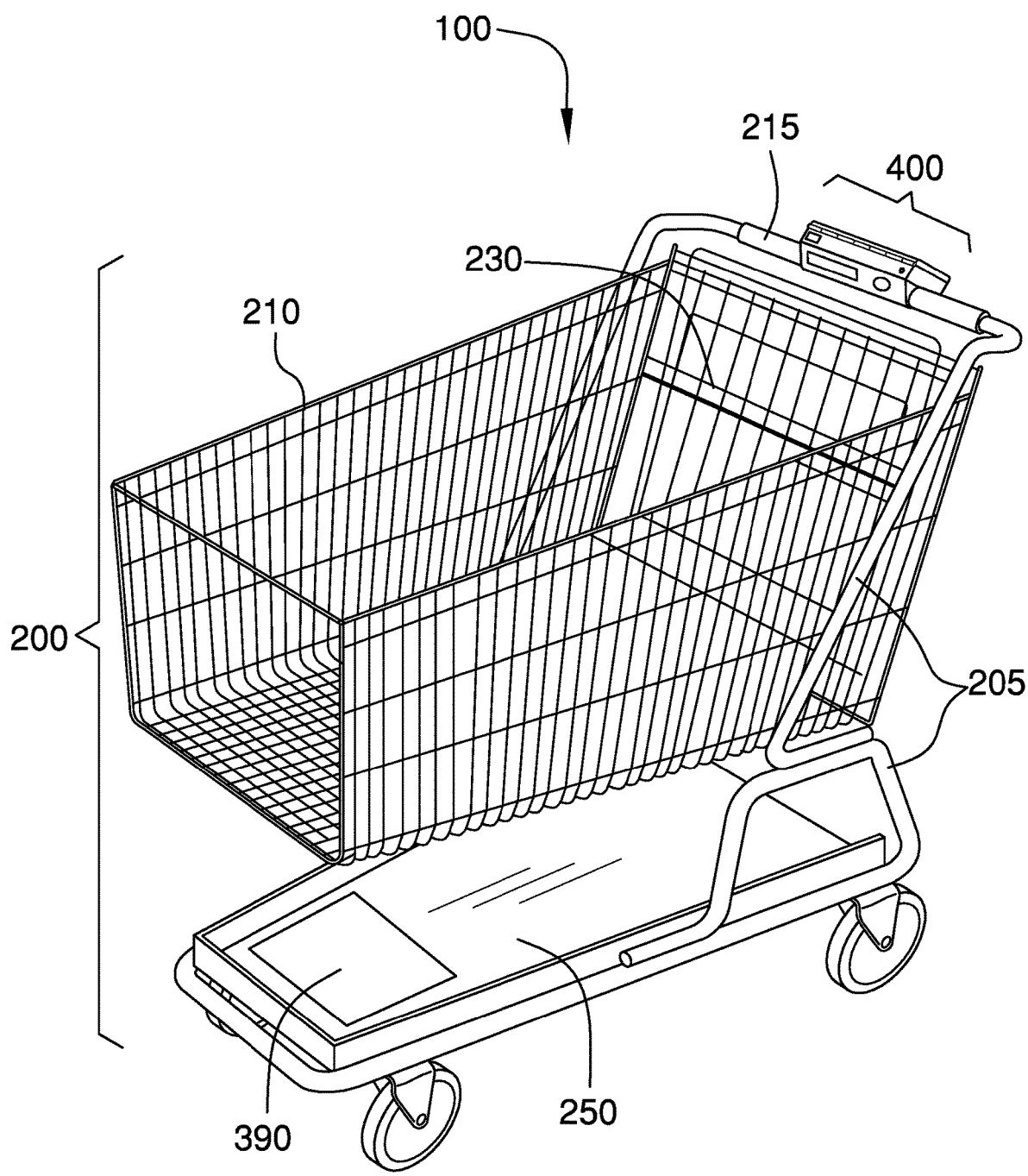
FIG. 1 is a perspective view of an embodiment of the disclosure.
Figure 2:
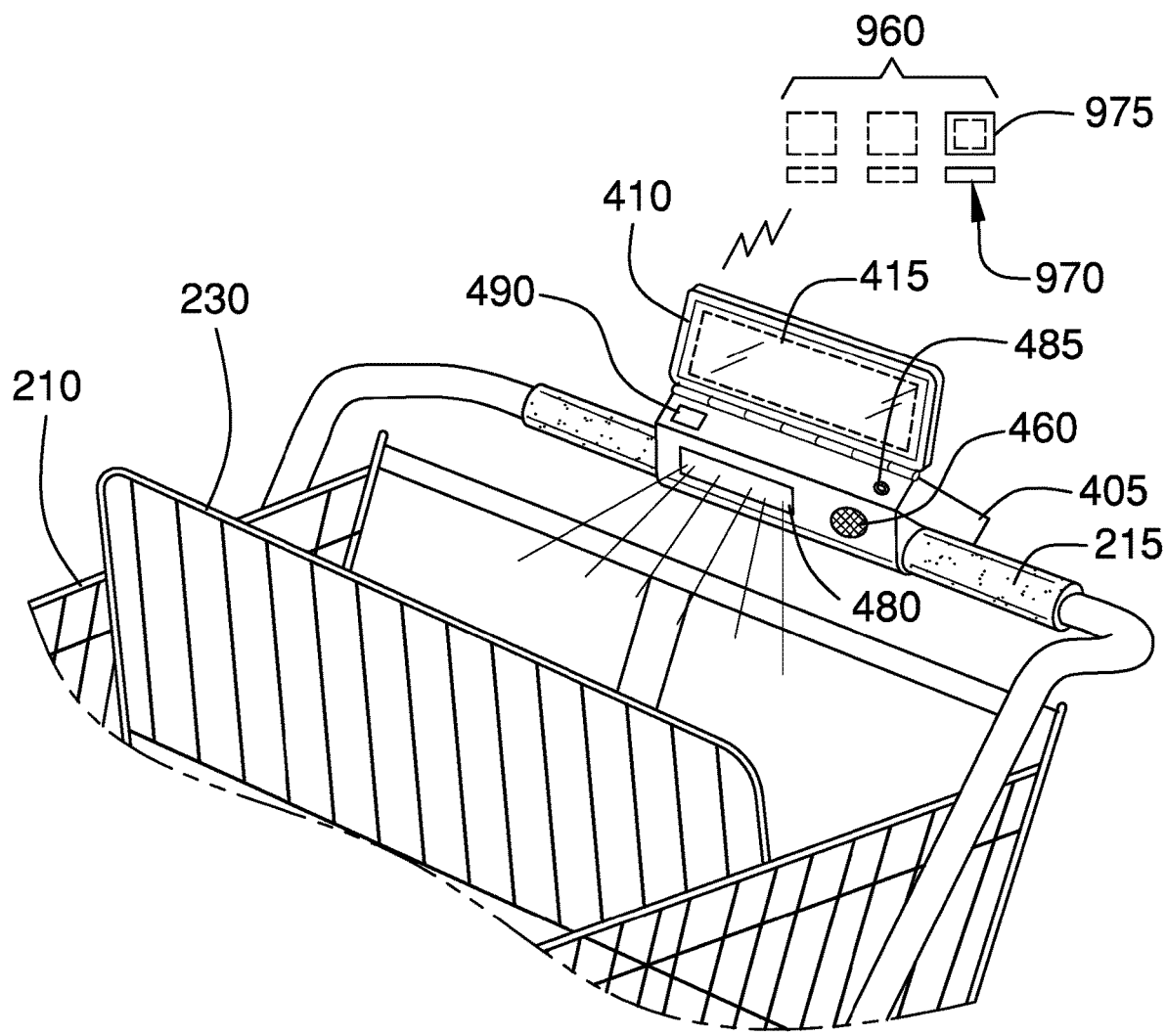
FIG. 2 is a detail view of an embodiment of the disclosure illustrating the controller and child seat.
Figure 3:
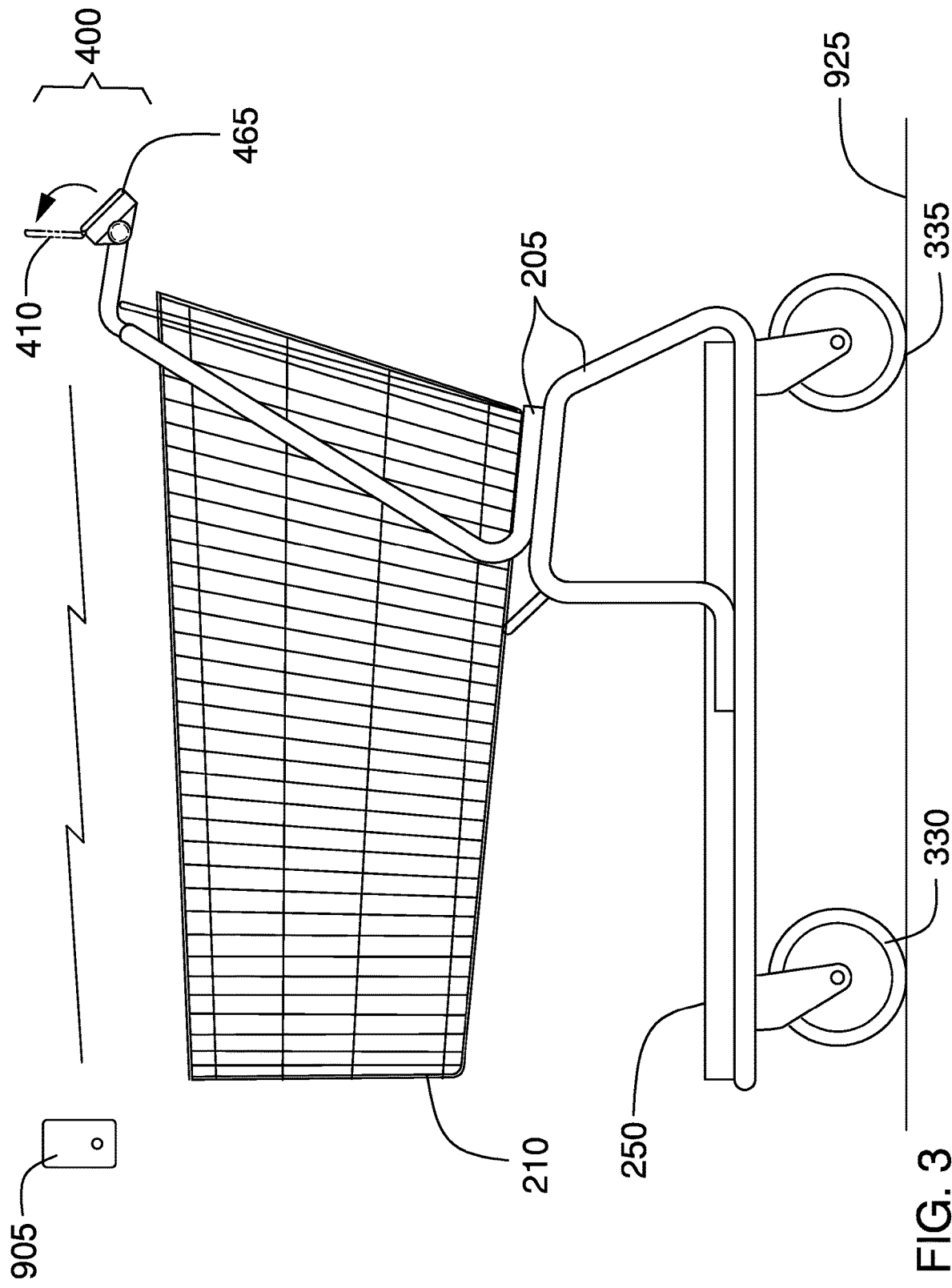
FIG. 3 is a side view of an embodiment of the disclosure.
Figure 6:
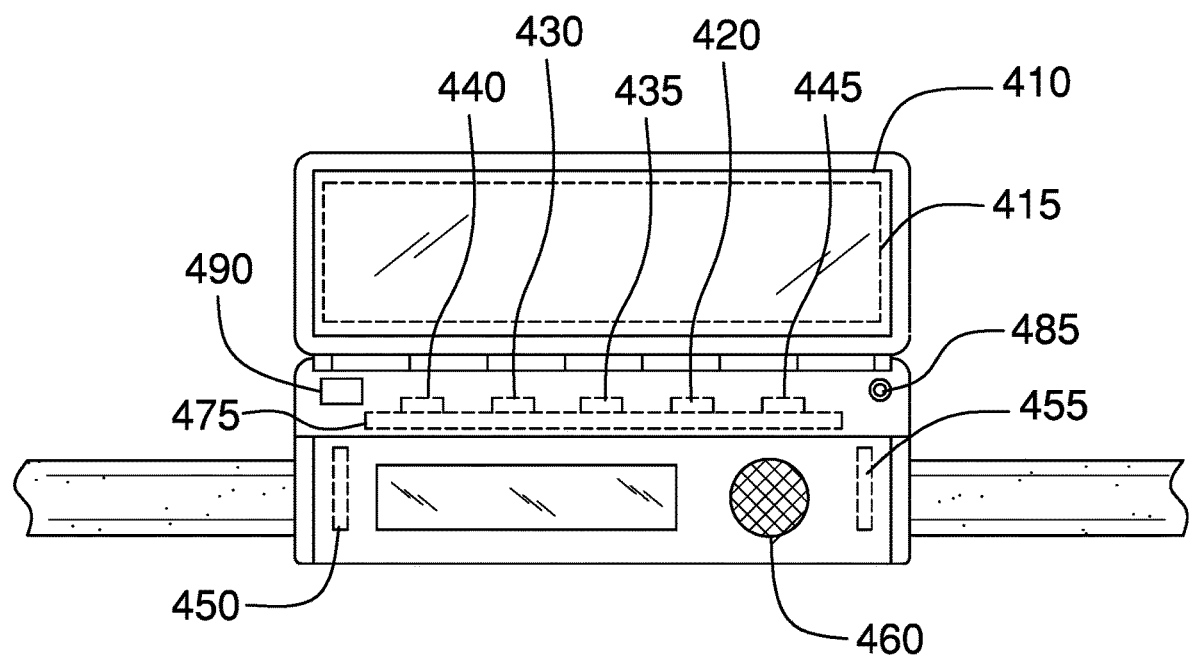
FIG. 6 is a detail view of an embodiment of the disclosure illustrating the controller.

Detailed reference will now be made to a first potential embodiment of the disclosure, which is illustrated in FIGS. 1 through 6.

The automated robotic shopping cart 100 (hereinafter invention) comprises a locomotion subsystem, a controller 400, and a cart 200. The invention 100 is a shopping cart that may be adapted to follow a shopper by tracking a phone 905 that is in the possession of the shopper. The invention 100 may be adapted to provide shopping assistance to the shopper using a display 410 and a touch screen 415. The invention 100 may be adapted to entertain a child riding in the cart 200.

The locomotion subsystem comprises a drive motor 310, an axle 315, a pair of rear wheels 335, a steering motor 320, a steering linkage 325, a pair of front wheels 330, one or more batteries 350, and a battery enclosure 355. The drive motor 310 may cause the cart 200 to move forward or backwards by turning the pair of rear wheels 335. The steering motor 320 may steer the cart 200 by changing a steering angle of the pair of front wheels 330.

The drive motor 310 may be mounted under a frame 205 at the rear of the cart 200. The drive motor 310 may convert electrical energy into mechanical energy. The drive motor 310 may cause rotation of the axle 315 and the pair of rear wheels 335 when electrical energy is applied to the drive motor 310. The electrical energy applied to the drive motor 310 may be controlled by the controller 400. The drive motor 310 may be oriented such that the shaft of the drive motor 310 runs horizontally from left to right. The axle 315 may be laterally oriented and the ends of the axle 315 may be coupled to the pair of rear wheels 335. The axle 315 may be an extension of the shaft of the drive motor 310 or may be rotationally coupled to the shaft of the drive motor 310.

The steering motor 320 may be mounted under the frame 205 at the front of the cart 200. The steering motor 320 may convert electrical energy into mechanical energy. The steering motor 320 may cause movement of the steering linkage 325 when electrical energy is applied to the steering motor 320. The electrical energy applied to the steering motor 320 may be controlled by the controller 400. The steering motor 320 may be oriented such that the shaft of the steering motor 320 runs vertically. The steering linkage 325 may coupled to the bottom of the shaft of the steering motor 320. The steering linkage 325 may extend laterally and the ends of the steering linkage 325 may be coupled to the pair of front wheels 330. Rotation of the steering motor 320 may cause movement of the steering linkage 325 to the right or to the left and may cause the pair of front wheels 330 to change their the steering angle.

The one or more batteries 350 may comprise one or more energy-storage devices. The one or more batteries 350 may be a source of electrical energy to operate the drive motor 310, the steering motor 320, and the controller 400. The one or more batteries 350 may be replaceable or rechargeable. The one or more batteries 350 may be mounted under a tray 250 in the battery enclosure 355.

The controller 400 comprises a controller enclosure 405, the display 410, the touch screen 415, one or more operator controls 465, a first transceiver 440, a second transceiver 445, a first antenna 450, a second antenna 455, an audio transducer 460, and a headphone port 485. The controller enclosure 405 protects a microprocessor 430, a memory 435, the display 410 the touch screen 415, and other components of the controller 400 from damage. The display 410 may hingedly couple to the controller enclosure 405 such that a viewing angle of the display 410 may be adjusted by tilting the display 410. The display 410 may be adapted to be tilted by an angle greater than 180 degrees such that the display 410 faces the child riding in a child seat 230. The controller 400 may sense that the tilt angle is greater than 180 degrees and may adjust the display 410 to be readable at that angle.

As a non-limiting example, the controller 400 may rotate the display image, flip the display image, reverse the display image, or combinations thereof. The display 410 may be covered by the touch screen 415 which may be adapted to accept a user input from the shopper and which may communicate the user input to the microprocessor 430. The touch screen 415 may overlay the display 410 such that associations between the user inputs and specific display images are formed. The controller 400 may interpret touches associated with specific display images as instructions for the controller 400 to perform specific tasks. Non-limiting examples of tasks include pairing the controller 400 with the phone 905, requesting the location of a specific item within a store, start, stop, or pause playback of audio/visual content, or selected an item from a menu of the application program executing on the controller 400. The controller 400 may comprise the one or more operator controls 465 that are accessible on the surface of the controller enclosure 405. The one or more operator controls 465 may be adapted to accept the user input for the controller 400 from the shopper without having to use the display 410 and the touch screen 415. As a non-limiting example, one of the one or more operator controls 465 may be a power on/off control for the controller 400.

The controller 400 may comprise the microprocessor 430 and the memory 435 wherein the memory 435 contains instructions for causing the microprocessor 430 to control the sequence and timing of motions of the cart 200, pairing with the phone 905, operation of the display 410 and the touch screen 415, and other tasks performed by the controller 400. The memory 435 may comprise volatile memory, non-volatile memory, or combinations thereof. The memory 435 may store programs, data used by the programs, or combinations thereof. The microprocessor 430 and the memory 435 may be located on one or more circuit boards 475 that are mounted within the controller enclosure 405.

The first transceiver 440 may transmit and receive information wirelessly via the first antenna 450. As a non-limiting example, the controller 400 may download audio/visual content to display via the first transceiver 440 and the first antenna 450. The first transceiver 440 may measure and report the strength of the signal for another transceiver that it is paired with. The controller 400 may estimate the distance between the first transceiver 440 and the other transceiver based upon the measured signal strength. The first transceiver 440 may be adapted to pair with the phone 905 that is in the possession of the shopper so that the controller 400 is made aware of the estimated distance to the phone 905. The second transceiver 445 may transmit and receive information wirelessly via the second antenna 455. The second transceiver 445 may measure and report the strength of the signal for another transceiver that it is paired with. The controller 400 may estimate the distance between the second transceiver 445 and the other transceiver based upon the measured signal strength. The second transceiver 445 may be adapted to pair with the phone 905 that is in the possession of the shopper so that the controller 400 is made aware of the estimated distance to the phone 905.

The controller 400 may use the first transceiver 440 and the first antenna 450 or the second transceiver 445 and the second antenna 455 to communicate with one or more computers 960 or other store infrastructure to transfer information between the controller 400 and a main computer 970. As a non-limiting example, the store infrastructure may comprise networking equipment such as hubs, switches, and routers that have wireless interfaces that are compatible with the controller 400. The main computer 970 may refer to one of the one or more computers 960 that are running an application program 975 to manage the controllers 400. The first antenna 450 and the second antenna 455 may be located on opposite sides of the controller enclosure 405 to provide lateral separation of the antennas. The controller 400 may use the estimated or known distances between the first antenna 450 and the phone 905, the second antenna 455 and the phone 905, and the first antenna 450 and the second antenna 455 to estimate a distance and bearing to the phone 905. As a non-limiting example, the distance and bearing to the phone 905 may be computed using triangulation.

The controller 400 may use the estimated distance and bearing to the phone 905 to calculate movements to be made by the cart 200. The controller 400 may energize the steering motor 320 and/or the drive motor 310 to effect the movements of the cart 200. As a non-limiting example, if the controller 400 determines that the phone 905 is ahead of the cart 200 by a distance equal to the length of the cart 200 and is 20 degrees to the left of a centerline of the cart 200, the controller 400 may energize the drive motor 310 to move the cart 200 ahead by a distance equal to the length of the cart 200 and may energize the steering motor 320 to steer the cart 200 20 degrees to the left.

The audio transducer 460 may convert an electrical signal into audible sounds. The electrical signal may originate within the controller 400 may encode voice, music, tones, or other sounds. As a non-limiting example, the audio transducer 460 may play the audio portion of a cartoon that is being displayed on the display 410. The electrical signals presented to the audio transducer 460 may also be presented to the headphone port 485 such that the same audio that is playing through the audio transducer 460 may also be played through an earbud or a pair of headphones that are plugged into the headphone port 485. The headphone port 485 may interrupt the electrical signal from reaching the audio transducer 460 when the earbud or the pair of headphones are plugged into the headphone port 485.

The cart 200 comprises the frame 205, a basket 210, and the tray 250. The frame 205 may provide a rigid structure onto which the basket 210, the tray 250, the locomotion subsystem, and the controller 400 may be mounted. The frame 205 may be L-shaped when viewed from a side with the lower, horizontal portion of the L forming a mount for the pair of front wheels 330, the pair of rear wheels 335, and the tray 250 and the vertical portion of the L rising at the rear of the cart 200 for pushing and for mounting the basket 210 and the controller 400. The pair of front wheels 330 and the pair of rear wheels 335 may be mounted onto the bottom side of the lower portion of the frame 205. The cart 200 may comprise the tray 250 that is coupled to the frame 205 above the pair of front wheels 330 and the pair of rear wheels 335. The tray 250 may be a planar surface for storing purchase selections that are bulky. One or more edges of the tray 250 may be raised to prevent the purchase selections from sliding off of the tray 250. The rear of the frame 205 may extend upward and form a handle 215 which may be used to push the cart 200. The basket 210 may be coupled to the rear, vertical portion of the frame 205. The basket 210 may be a rectangular wire container having an open top. The basket 210 may extend forward from the rear of the frame 205 such that the bottom of the basket 210 is at a height of between 15 inches and 36 inches above a floor 925. The rear of the basket 210 may comprise the child seat 230 that pivots open from the rear wall of the basket 210. The child seat 230 may provide a seat back, a seat, and leg holes for the child to sit within the basket 210. In some embodiments, the basket 210 may be detachable so that the frame 205 and the tray 250 may be used as a flat-bed cart.

One or more solar panels 390 may comprise one or more photovoltaic cells. The one or more solar panels 390 may convert light striking the one or more solar panels 390 into direct current electricity. The one or more solar panels 390 may provide electricity to the one or more batteries 350. The one or more solar panels 390 may be mounted on the cart 200 in a location where they may be exposed to sunlight when the cart 200 is outdoors. As a non-limiting example, the one or more solar panels 390 may be mounted on the back side of the display 410. The one or more solar panels 390 may recharge the one or more batteries 350 when the cart 200 is left outdoors.

The enclosures covering the drive motor 310, the steering motor 320, the one or more batteries 350, the display 410, and the controller 400 may all be weatherproof such that electrical and electromechanical components are not damaged by rain, wind, snow, sleet, and/or other weather conditions that the cart 200 may be exposed to when left outdoors.

A reading light 480 may be mounted within the controller enclosure 405 where it may shine in front of the controller 400 when activated. The reading light 480 may be illuminated using one of the one or more operator controls 465 and/or the user input provided through the display 410 and the touch screen 415. The reading light 480 may be used to illuminate product labels.

In some embodiments, the controller 400 may comprise a GPS receiver 420 through which the controller 400 may determine its physical location. Perimeter coordinates of the store's property may be downloaded to the controller 400 from the main computer 970 and the controller 400 may use location information obtained from the GPS receiver 420 to determine if the cart 200 is within boundaries established by the perimeter coordinates. A determination that the cart 200 is outside of the boundaries may indicate that the cart 200 has been pushed off of the property and may indicate theft of the cart 200. Responsive to a determination that the cart 200 is outside of the boundaries established by the perimeter coordinates, the controller 400 may activate a brake 340 that may be built into the drive motor 310.

In some embodiments, the one or more operator controls 465 may comprise a distress button 490. Activation of the distress button 490 may result in the controller 400 producing an alert sound using the audio transducer 460, blinking the reading light 480, communicating a distress message to the main computer 970 via the first transceiver 440 and the first antenna 450, or combinations thereof. The distress button 490 may be adapted to indicate that the shopper or another individual in the vicinity of the shopper requires assistance.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "application" or "app" is software that is specifically designed for use with a personal computing device.

As used in this disclosure, an "axle" is a cylindrical shaft that is inserted through the center of an object such that the center axis of the object and the center axis of the axle are aligned and the object can rotate using the axle as an axis of rotation.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "brake" is a device that is used to slow or stop the motion of a machine or a vehicle.

As used herein, "bulky" refers to items that may require special handling because they are of larger size, mass, or volume than other items within a same category of items.

As used herein, a "cart" is a vehicle that can be easily moved by a person.

As used in this disclosure, the "centerline" is an imaginary line that defines the center of multiple cross sections of an object. Unless stated otherwise, the centerline follows a longitudinal path through the object at the center of lateral cross sections. If the object is tubular, the centerline follows the center of the tube.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used herein, "encode" refers to altering a signal, a message, or a dataset to embed information into the signal, the message, or the dataset. "Decode" refers to extracting or recovering the information from the signal, the message, or the dataset. By way of example and not of limitation, the purpose of encoding and decoding may be to obfuscate the information during transmission or storage, to modulate a signal, to increase the efficiency of a communications or storage medium, or to convert one format into another format.

As used in this disclosure, a "display" is a surface upon which is presented an image, potentially including, but not limited to, graphic images and text, that is interpretable by an individual viewing the image. When used as a verb, "display" is defined as presenting such an image.

As used in this disclosure, an "earbud" refers to a miniature headphone that is worn inside the ear.

As used herein, "energize" refers to the application of an electrical potential to a system or subsystem.

As used in this disclosure, a "floor" refers to the inferior horizontal surface of a room or structure.

As used herein, "front" indicates the side of an object that is closest to a forward direction of travel under normal use of the object or the side or part of an object that normally presents itself to view or that is normally used first. "Rear" or "back' refers to the side that is opposite the front.

As used herein, "GPS" refers to a device that uses signals received from a system of navigational satellites to determine the position of the device. GPS is an acronym for Global Positioning System.

As used in this disclosure, a "handle" is an object by which a tool, object, or door is held or manipulated with the hand.

As used in this disclosure, a "headphone" is a device that comprises one or two earphones that are held to the ear, typically through the use of a band placed on top of the head. The headphone comprises one or more speakers and an optional microphone to allow for: 1) private access to an audio communication system; and, 2) hands free access to an audio communication system. Headset is a synonym for headphone.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a side. Lateral directions are generally perpendicular to longitudinal directions. "Laterally" refers to movement in a lateral direction.

As used in this disclosure, a "light" is an electrical device that generates visible light to illuminate objects so they can be seen.

As used in this disclosure, a "motor" refers to a device that transforms energy from an external power source into mechanical energy.

As used herein, "pair", "paired", and "pairing" refer to a connection established between two wireless devices.

As used in this disclosure, a "perimeter" is one or more curved or straight lines that bound an enclosed area on a plane or surface. The perimeter of a circle is commonly referred to as a circumference.

As used in this disclosure, a "port" is an electrical termination that is used to connect a first electrical circuit to a second external electrical circuit.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "rigid structure" is a solid structure that is inflexible and will not deform before breaking under a force.

As used in this disclosure, the term "shaft" is used to describe a rigid cylinder that is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "speaker" is an electrical transducer that converts an electrical signal into an audible sound; also known as a loudspeaker.

As used herein, "steering angle" refers to angle between the centerline of a vehicle and the steered wheel direction.

As used in this disclosure, a "touchscreen" is an interface that allows a user to interface with a logical device by touching the image bearing surface of a display.

As used in this disclosure, a "transceiver" is a device that is used to transmit and/or receive signals. The signals may be audible, optical, or RF in nature.

As used in this disclosure, a "transducer" is a device that converts a physical quantity, such as pressure or brightness into an electrical signal or a device that converts an electrical signal into a physical quantity.

As used herein, "triangulation" is a determination of a distance and bearing to an unknown position from a position on a baseline based upon knowing the length of the baseline and knowing the angular measurements between the baseline and a line drawn through the unknown position and the end of the baseline at each end of the baseline.

As used in this disclosure, "vertical" refers to a direction that is parallel to the local force of gravity. Unless specifically noted in this disclosure, the vertical direction is always perpendicular to horizontal.

As used in this disclosure, "wireless" is an adjective that is used to describe a communication channel that does not require the use of physical cabling.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A automated robotic shopping cart comprising:
   a locomotion subsystem, a controller, and a cart;
   wherein the automated robotic shopping cart is a shopping cart that is adapted to follow a shopper by tracking a phone that is in the possession of the shopper;
   wherein the automated robotic shopping cart is adapted to provide shopping assistance to the shopper using a display and a touch screen;
   wherein the automated robotic shopping cart is adapted to entertain a child riding in the cart;
   wherein the locomotion subsystem comprises a drive motor, an axle, a pair of rear wheels, a steering motor, a steering linkage, a pair of front wheels, one or more batteries, and a battery enclosure;
   wherein the drive motor causes the cart to move forward or backwards by turning the pair of rear wheels;
   wherein the steering motor steers the cart by changing a steering angle of the pair of front wheels;
   wherein the drive motor is mounted under a frame at the rear of the cart;
   wherein the drive motor converts electrical energy into mechanical energy;
   wherein the drive motor causes rotation of the axle and the pair of rear wheels when electrical energy is applied to the drive motor;
   wherein the electrical energy applied to the drive motor is controlled by the controller;
   wherein the drive motor is oriented such that the shaft of the drive motor runs horizontally from left to right;
   wherein the axle is laterally oriented and the ends of the axle are coupled to the pair of rear wheels;
   wherein the axle is an extension of the shaft of the drive motor or is rotationally coupled to the shaft of the drive motor;
   wherein the steering motor is mounted under the frame at the front of the cart;
   wherein the steering motor converts electrical energy into mechanical energy;
   wherein the steering motor causes movement of the steering linkage when electrical energy is applied to the steering motor;
   wherein the electrical energy applied to the steering motor is controlled by the controller;
   wherein the steering motor is oriented such that the shaft of the steering motor runs vertically;
   wherein the steering linkage is coupled to the bottom of the shaft of the steering motor;
   wherein the steering linkage extends laterally and the ends of the steering linkage are coupled to the pair of front wheels;
   wherein rotation of the steering motor causes movement of the steering linkage to the right or to the left and causes the pair of front wheels to change their the steering angle.

2. The automated robotic shopping cart according to claim 1
   wherein the one or more batteries comprise one or more energy-storage devices;
   wherein the one or more batteries are a source of electrical energy to operate the drive motor, the steering motor, and the controller;
   wherein the one or more batteries are replaceable or rechargeable;
   wherein the one or more batteries are mounted under a tray in the battery enclosure.

3. The automated robotic shopping cart according to claim 2
   wherein the controller comprises a controller enclosure, the display, the touch screen, one or more operator controls, a first transceiver, a second transceiver, a first antenna, a second antenna, an audio transducer, and a headphone port;
   wherein the controller enclosure protects a microprocessor, a memory, the display the touch screen, and other components of the controller from damage;
   wherein the display hingedly couples to the controller enclosure such that a viewing angle of the display is adjusted by tilting the display;
   wherein the display is adapted to be tilted by an angle greater than 180 degrees such that the display faces the child riding in a child seat;
   wherein the controller senses that the tilt angle is greater than 180 degrees and adjusts the display to be readable at that angle;
   wherein the display is covered by the touch screen which is adapted to accept a user input from the shopper and which communicates the user input to the microprocessor;
   wherein the controller comprises the one or more operator controls that are accessible on the surface of the controller enclosure;
   wherein the one or more operator controls are adapted to accept the user input for the controller from the shopper without having to use the display and the touch screen.

4. The automated robotic shopping cart according to claim 3
   wherein the controller comprises the microprocessor and the memory wherein the memory contains instructions for causing the microprocessor to control the sequence and timing of motions of the cart, pairing with the phone, operation of the display and the touch screen, and other tasks performed by the controller;
   wherein the memory comprises volatile memory, non-volatile memory, or combinations thereof;
   wherein the memory stores programs, data used by the programs, or combinations thereof;

wherein the microprocessor and the memory are located on an one or more circuit boards that are mounted within the controller enclosure.

5. The automated robotic shopping cart according to claim 4 wherein the first transceiver transmits and receive information wirelessly via the first antenna;

wherein the first transceiver measures and report the strength of the signal for another transceiver that it is paired with;

wherein the controller estimates the distance between the first transceiver and the other transceiver based upon the measured signal strength;

wherein the first transceiver is adapted to pair with the phone that is in the possession of the shopper so that the controller is made aware of the estimated distance to the phone;

wherein the second transceiver transmits and receive information wirelessly via the second antenna;

wherein the second transceiver measures and report the strength of the signal for another transceiver that it is paired with;

wherein the controller estimates the distance between the second transceiver and the other transceiver based upon the measured signal strength;

wherein the second transceiver is adapted to pair with the phone that is in the possession of the shopper so that the controller is made aware of the estimated distance to the phone.

6. The automated robotic shopping cart according to claim 5 wherein the controller uses the first transceiver and the first antenna or the second transceiver and the second antenna to communicate with one or more computers or other store infrastructure to transfer information between the controller and a main computer;

wherein the first antenna and the second antenna are located on opposite sides of the controller enclosure to provide lateral separation of the antennas;

wherein the controller uses the estimated or known distances between the first antenna and the phone, the second antenna and the phone and the first antenna, and the second antenna to estimate a distance and bearing to the phone.

7. The automated robotic shopping cart according to claim 6 wherein the distance and bearing to the phone are computed by the controller using triangulation.

8. The automated robotic shopping cart according to claim 7 wherein the controller uses the estimated distance and bearing to the phone to calculate movements to be made by the cart;

wherein the controller energizes the steering motor and/or the drive motor to effect the movements of the cart.

9. The automated robotic shopping cart according to claim 8 wherein the audio transducer converts an electrical signal into audible sounds;

wherein the electrical signal originates within the controller and encodes voice, music, tones, or other sounds;

wherein the electrical signals presented to the audio transducer is presented to the headphone port such that the same audio that is playing through the audio transducer also plays through an earbud or a pair of headphones that are plugged into the headphone port;

wherein the headphone port interrupts the electrical signal from reaching the audio transducer when the earbud or the pair of headphones are plugged into the headphone port.

10. The automated robotic shopping cart according to claim 9 wherein the cart comprises the frame, a basket, and the tray;

wherein the frame provides a rigid structure onto which the basket, the tray, the locomotion subsystem, and the controller are mounted;

wherein the frame is L-shaped when viewed from a side with the lower, horizontal portion of the L forming a mount for the pair of front wheels, the pair of rear wheels, and the tray and the vertical portion of the L rising at the rear of the cart for pushing and for mounting the basket and the controller;

wherein the pair of front wheels and the pair of rear wheels are mounted onto the bottom side of the lower portion of the frame;

wherein the cart comprises the tray that is coupled to the frame above the pair of front wheels and the pair of rear wheels;

wherein the tray is a planar surface for storing purchase selections;

wherein the rear of the frame extends upward and forms a handle which is used to push the cart;

wherein the basket is coupled to the rear, vertical portion of the frame;

wherein the basket is a rectangular wire container having an open top;

wherein the basket extends forward from the rear of the frame such that the bottom of the basket is at a height of between 15 inches and 36 inches above a floor;

wherein the rear of the basket comprises the child seat that pivots open from the rear wall of the basket.

11. The automated robotic shopping cart according to claim 10 wherein the basket is detachable so that the frame and the tray comprise a flat-bed cart.

12. The automated robotic shopping cart according to claim 10 wherein one or more solar panels comprise one or more photovoltaic cells;

wherein the one or more solar panels convert light striking the one or more solar panels into direct current electricity;

wherein the one or more solar panels provide electricity to the one or more batteries;

wherein the one or more solar panels are mounted on the cart in a location where they are exposed to sunlight when the cart is outdoors;

wherein the one or more solar panels recharge the one or more batteries when the cart is left outdoors.

13. The automated robotic shopping cart according to claim 12 wherein the enclosures covering the drive motor, the steering motor, the one or more batteries, the display, and the controller are weatherproof such that electrical and electromechanical components are not damaged by rain, wind, snow, sleet, and/or other weather conditions that the cart is exposed to when left outdoors.

14. The automated robotic shopping cart according to claim 13 wherein a reading light is mounted within the controller enclosure where it shines in front of the controller when activated;

wherein the reading light is illuminated using one of the one or more operator controls and/or the user input provided through the display and the touch screen;

wherein the reading light is used to illuminate product labels.

15. The automated robotic shopping cart according to claim 14 wherein the controller comprises a GPS receiver through which the controller determines its physical location;

wherein perimeter coordinates of the store's property is downloaded to the controller from the main computer and the controller use location information obtained from the GPS receiver to determine if the cart is within boundaries established by the perimeter coordinates;

wherein a determination that the cart is outside of the boundaries indicates that the cart has been pushed off of the property and indicates theft of the cart;

wherein responsive to a determination that the cart is outside of the boundaries established by the perimeter coordinates, the controller activates a brake that is built into the drive motor.

16. The automated robotic shopping cart according to claim 15 wherein the one or more operator controls comprise a distress button;

wherein activation of the distress button results in the controller producing an alert sound using the audio transducer, blinking the reading light, communicating a distress message to the main computer via the first transceiver and the first antenna, or combinations thereof;

wherein the distress button is adapted to indicate that the shopper or another individual in the vicinity of the shopper requires assistance.

\* \* \* \* \*